Oct. 20, 1953     R. R. CROOKSTON     2,656,174
GOVERNOR FOR PRIME MOVER WITH COMPRESSED AIR CONTROL
FOR ADJUSTING IT TO A WIDE RANGE OF SPEEDS
Filed Nov. 13, 1950     3 Sheets-Sheet 2

INVENTOR.
Robert R. Crookston,
BY

*Melvin F. Pincke*

ATTORNEY.

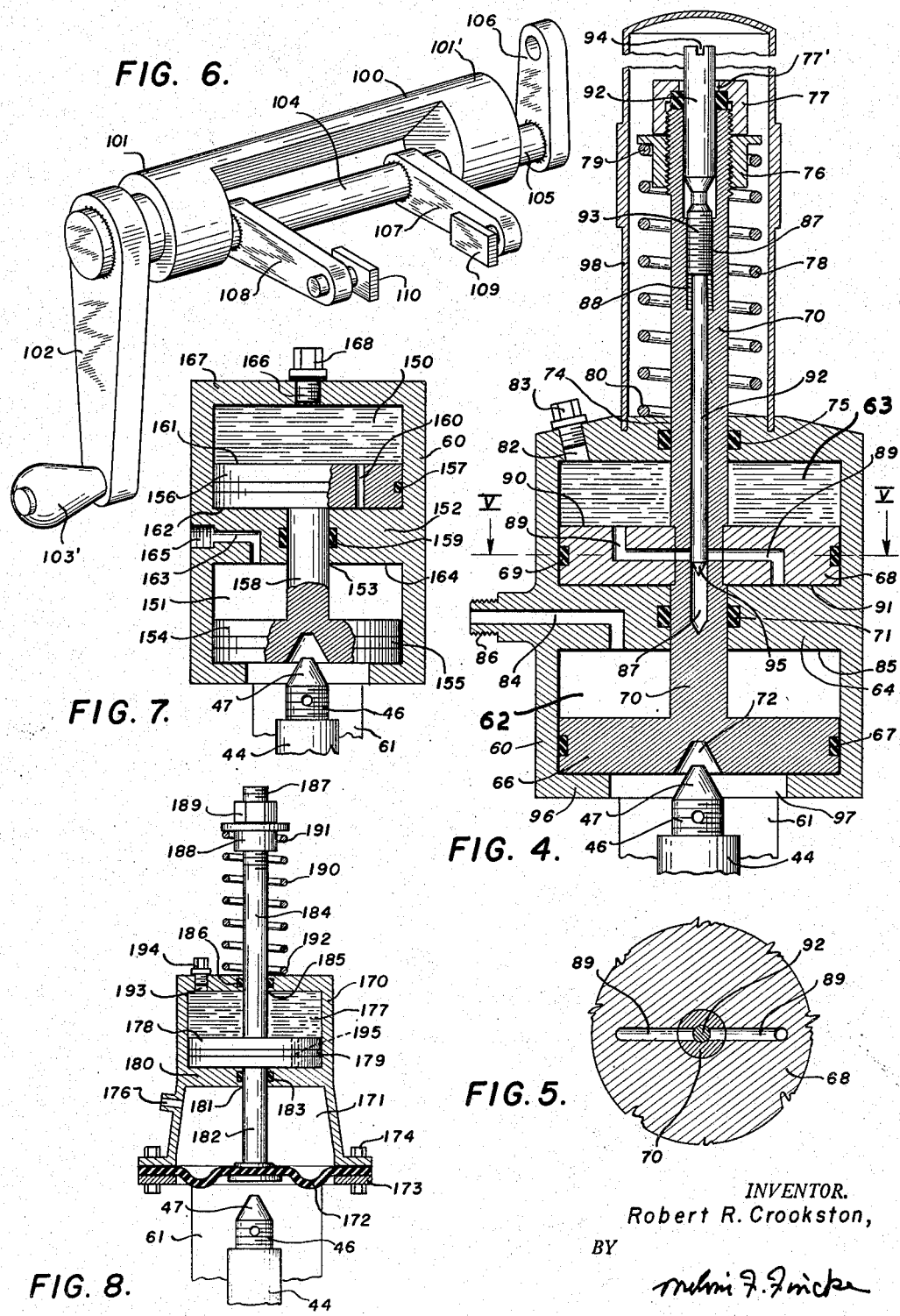

Patented Oct. 20, 1953

2,656,174

UNITED STATES PATENT OFFICE 2,656,174

GOVERNOR FOR PRIME MOVER WITH COMPRESSED AIR CONTROL FOR ADJUSTING IT TO A WIDE RANGE OF SPEEDS

Robert R. Crookston, Houston, Tex., assignor, by mesne assignments, to Standard Oil Development Company, Elizabeth, N. J., a corporation of Delaware Application November 13, 1950, Serial No. 195,175

11 Claims. (Cl. 264—3)

This invention relates to a governing mechanism designed to maintain the speed of a prime mover with which it is associated within reasonably constant limits irrespective of the load which may be placed on the prime mover.

In many of the instances in which rotating engines are utilized, it is desirable to have a readily controllable, variable speed governor effective over a wide range of engine speeds. For example, in ship propulsion, means employed in connection with the ship's engines for accomplishing the aforementioned purpose is often employed. Another example is encountered in well drilling. In well drilling it is often desirable to operate the prime mover employed at a relatively constant, but adjustably variable, speed. There are, of course, many other instances in which it is desirable to operate a rotating engine at relatively constant speed irrespective of the load placed thereon, and it is further desirable that the means employed for controlling the speed be adjustable to any speed at which it is desired that the engine be operated. It is, of course, essential that such means be stable at the operating speed maintained.

The rotative speed of prime movers is commonly controlled by means of governors. While various different types of governors have been developed, the present invention is concerned with a centrifugal governor. Centrifugal governors depend for their action upon centrifugal force and consist essentially of a pair of masses rotating about a spindle driven by the prime mover, the speed of which is to be controlled. These masses, when rotated, tend to fly outwardly, the governor being provided with a controlling force to resist this outward motion. With an increase in speed, the controlling force is overcome and the masses move outwardly, this outward motion producing linear motion in the spindle. The spindle, in turn, is mechanically connected to valves supplying the prime mover with working fluid or fuel, reducing or increasing the supply of working fuel thereto depending upon whether the speed of the prime mover is greater than or less than the desired speed.

In the past, a number of different types of centrifugal governors have been developed. One well-known type is that invented by James Watt. In the Watt governor, also known as the conical pendulum governor, the revolving masses are balls attached to a vertical spindle by link arms and the controlling force consists of the weight of the balls themselves. In this mechanism the centrifugal force exerted by the rotating balls is combatted by the weight of these balls.

Another well-known governor, commonly known as the Porter governor, consists of the Watt governor with the addition of a heavy, movable weight surrounding the vertical spindle. In the Porter governor, the centrifugal force exerted by the revolving balls is combatted by the force of gravity exerted on the heavy, movable weight surrounding the spindle.

Unfortunately, neither the Watt governor nor the Porter governor is suitable for controlling the speed of a prime mover over a wide range of engine speeds. The Watt governor is not adjustable for different speeds, and while it is quite stable at relatively low speeds, it is unstable at intermediate and high speeds. On the other hand, the Porter governor can be so constructed as to be stable at medium and high speeds but then it is normally unstable at low speeds. Because of these inherent limitations in the Watt and Porter governors, another type of centrifugal governor, namely the spring-loaded type, has been developed.

The controlling force, in the spring-loaded governor, is wholly or partly produced by means of springs. In this type, the centrifugal force exerted by the rotating balls is combatted by the force supplied either by a single spring or by a plurality of springs which may be arranged either in tension or in compression. If a single spring is used with the initial compression or tension of the spring preset to give different operating ranges, little difficulty will be experienced in providing a spring-loaded governor capable of adjustment for control over a 2:1 speed range. Inasmuch as the initial stress required is proportional to the square of the speed range covered, an initial stress in the spring of 4:1 is required to take care of a 2:1 speed range. When, however, an attempt is made to provide a 10:1 speed range, the spring requirements are for a 100:1 initial stress. Due to the finite characteristics of springs, the provision of a 100:1 initial stress is impractical.

Because it is impractical to employ a single spring only when it is desired to cover a wide speed range, governors have been made available which employ two or more springs. If two or more springs with different rates are used operating in tandem, that is, first one is stressed and then the others are each stressed in turn by movement of the fly balls, the mean speed of governing may be varied within limits, these limitations changing in the same number of discrete steps as there are springs in tandem. These multi-spring governors may take two general forms. In one form the fly balls and arms are allowed to assume the same configuration at each chosen mean speed with the choice of the spring in use at any time and the initial loading on that spring being made by a screw-down device, or its equivalent, controlled either locally or remotely. In the other form the fly balls and arms are allowed to assume different configurations at each chosen mean speed; here the force from a second spring is realized after a chosen speed is reached with the initial loading of the springs adjustable within limits. The characteristics of either of these two type are such that, although the governor may be quite stable either when the prime mover is rotating at a low speed or when operating under full load, it is not both stable and reasonably sensitive throughout its speed range. It is even possible to select the springs so that the governor is both stable and reasonably sensitive at low speeds and at high speeds but unstable in the intermediate speeds. Instability at intermediate speeds is particularly undesirable in that the governor hunts over a very wide range when any attempt is made to control the speed of the prime mover at an intermediate speed.

It is an object of the present invention to provide a governor for maintaining the speed of prime movers within reasonably constant limits, the governor being adjustable for controlling over a wide range of speeds. It is a further object of the present invention to provide a governor upon which the aforementioned adjustments can be accomplished without stopping the rotation of the prime mover or without disengaging the governor.

The present invention is fully described hereinafter in conjunction with the drawing in which Fig. 1 is a front view, partly in cross section, of the governing device of the present invention;

Fig. 1–A is the upper portion of the device shown in Fig. 1;

Fig. 4 is a detailed view, partly in cross section, of the piston and dash pot arrangement shown in the upper part of Figs. 1 and 1–A;

Fig. 5 is a fragmentary sectional view taken along the line V—V of Fig. 4;

Fig. 6 is a perspective view showing the linkage between the yoke, the fuel rack, and the throttle arm shown in Fig. 1;

Fig. 7 is a view, partly in cross section, of a modification of the piston and dash pot arrangement shown in Fig. 4; and Fig. 8 is a view, partly in cross section, of a modification of a portion of the device shown in Figs. 1 to 6, inclusive.

Figure 1:
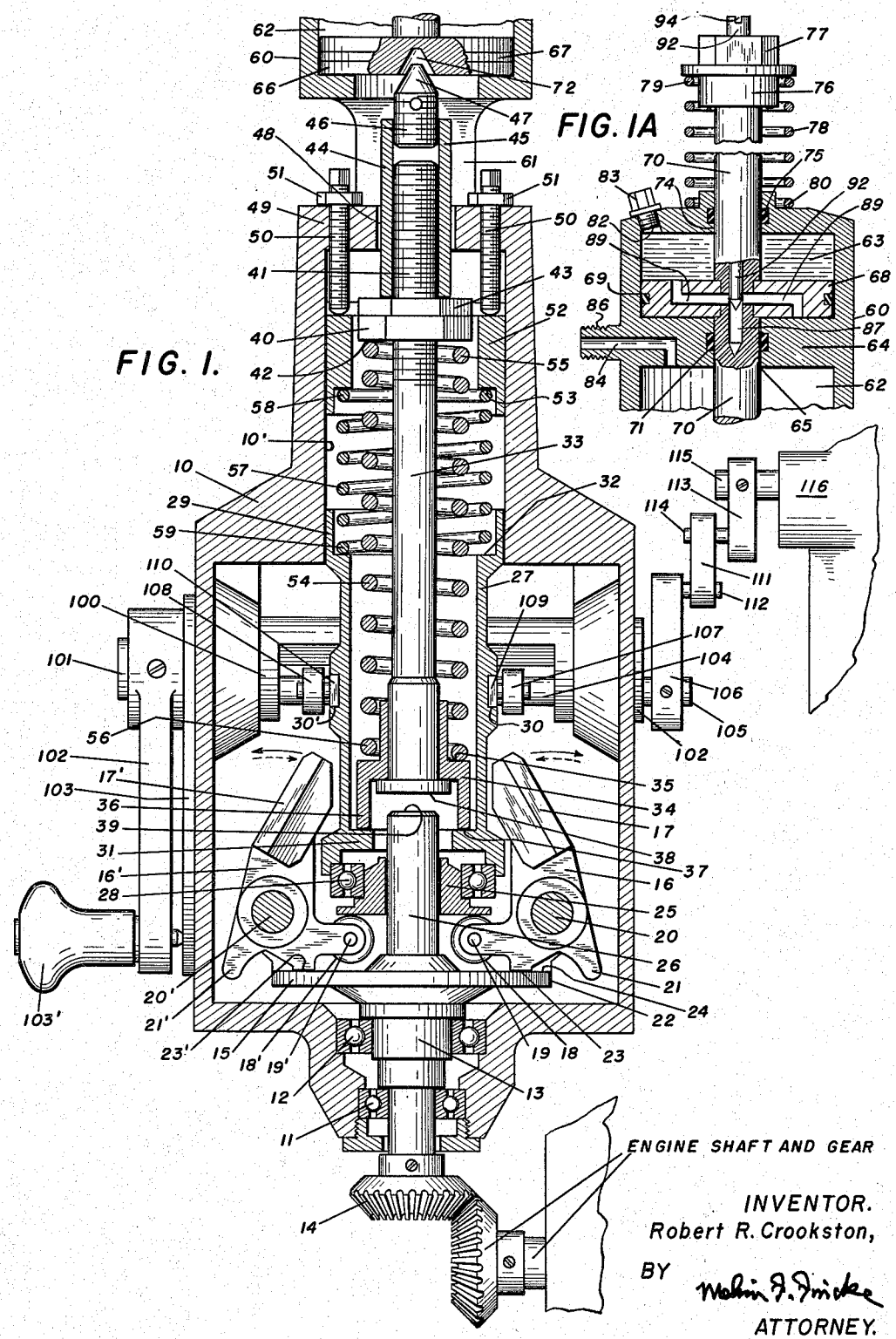

In the drawing, like numerals refer to like parts throughout. Referring to Figs. 1 to 6, inclusive, and particularly to Fig. 1, 10 designates the governor housing. Rotatably supported within governor housing 10 by means of bearings 11 and 12 is spindle 13. A bevel gear 14 is affixed to the lower end of spindle 13 exteriorly of housing 10. A governor weight supporting member 15 is affixed to spindle 13 within housing 10. L-shaped arm 16 carries governor weight 17 at the end of one branch and a rotatably mounted wheel 18 pivoted to the end of the other branch by pin 19 is pivotally mounted on member 15 by means of a pin 20. L-shaped member 16' carrying governor weight 17' at the end of one branch and a rotatably mounted wheel 18' pivoted to the end of the other branch by means of pin 19' is pivotally mounted on member 15 by means of pin 20'. L-shaped members 16 and 16' are mounted on member 15 diammetrically opposite from each other, the longitudinal axis of pins 20 and 20' about which members 16 and 16' pivot being parallel to each other. L-shaped member 16 defines a projection 21 which is adapted to abut against surface 22 of member 15 when the L-shaped member 16 is moved arcuately about pin 20 in a clockwise direction and defines a projection 23 which is designed to abut against surface 24 when L-shaped member 16 is moved arcuately about pin 20 in a counter-clockwise direction. L-shaped member 16' defines a projection 21' which is designed to abut against surface 22 of member 15 when it is moved arcuately about pin 20' in a counter-clockwise direction and defines projection 23' which is designed to abut against surface 24 of member 15 when it is moved arcuately about pin 20' in a clockwise direction.

A collar 25 is mounted on the upper end 26 of spindle 13, which may be splined as shown, for longitudinal movement on said end. A yoke member 27 is mounted within housing 10 so that its central axis is coincident with the central longitudinal axis of spindle 13, yoke member 27 being supported above collar 25 by means of bearing 28. The outer surface 29 adjacent the upper end of yoke 27 moves slidably in contact with inner surface 10' of housing 10. The outer surface of yoke member 27 intermediate its upper and lower ends defines a pair of diametrically opposed slots 30 and 30', the purpose of which will be later described. The longitudinal axis of slots 30 and 30' is perpendicular to the longitudinal axis of yoke member 27. Yoke member 27 defines inwardly extending shoulder 31 at its lower end and upwardly extending shoulder 32 adjacent its upper end.

Concentrically arranged within yoke member 27 is stem 33. Slidably mounted on the lower end of stem 33 for longitudinal movement with respect thereto is spring-retaining member 34 which defines upwardly extending shoulder 35 and downwardly extending rim portion 36. The lower surface 37 of downwardly extending rim portion 36 abuts on shoulder 31 of yoke member 27. The height of rim portion 36 is such that contact between lower surface 38 of stem 33 and upper surface 39 of spindle 13 is prevented when yoke member 27 is moved to its upper limit of travel. Spring-retaining member 40 is threadedly engaged with the upper threaded end 41 of stem 33, spring-retaining member 40 defining downwardly projecting shoulder 42. In order to prevent the rotation of upper spring-retaining member 40 on threaded end 41 of stem 33, a jam nut 43 is also threadedly engaged with threaded end portion 41 into position against spring-retaining member 40. Also threadedly engaged with the upper threaded end 41 of stem 33 above spring-retaining member 40 and jam nut 43 is a sleeve member 44. The height of sleeve 44 is such that its upper end 45 extends above the upper extremity of stem 33 and, accordingly, plug 46 is screw-threadedly engaged in said upper end. Plug 46 defines a conical-shaped tip 47 which projects above the upper end 45 of sleeve 44. Sleeve 44 moves freely through opening 48 defined by cap 49 of housing 10.

A spring-retaining member 52 is located in the upper section of governor body 10 and moves slidably in contact with inner surface 10' of the governor body. The upward movement of member 52 is limited by means of adjustable bolts 50, which are threaded to and project through cap member 49. Bolts 50 are locked in place by lock nuts 51 which abut against cap 49. The vertical position of member 52 can be altered as desired by loosening nuts 51 and rotating bolts 50 which bear against the top of member 52, in the appropriate direction, after which nuts 51 may again be tightened. Spring-retaining member 52 defines downwardly extending shoulder 53. The internal diameter of spring-retaining member 52 is such that this member does not interfere with the vertical movement of stem 33, spring-retaining member 40, and jam nut 43 therethrough.

Spring 54 is arranged concentrically around stem 33, the upper end 55 of said spring abutting against shoulder 42 of upper spring-retaining member 40 and the lower end 56 of spring 54 abutting against shoulder 35 of lower spring-retaining member 34. Spring 57 is of larger internal diameter than the external diameter of spring 54 and is concentrically arranged around stem 33 and spring 54. The upper end 58 of spring 57 abuts against shoulder 53 defined by spring-retaining member 52 while the lower end 59 of spring 57 abuts against shoulder 32 defined by yoke member 27. Spring 54 biases lower spring-retaining member 34 away from upper spring-retaining member 40 while spring 57 biases yoke 27 away from spring-retaining member 52. Spring 54, which has a high spring rate, is relatively stronger than spring 57, which has a low spring rate. Spring 54 may conveniently be termed the over speed spring while spring 57 may conveniently be termed the low speed spring. Both springs are preloaded, i. e., both are partially compressed, the preloading of spring 54 being greater than the preloading of spring 57.

A cylinder housing 60 is supported in fixed relation above cap 49 of housing 10, as by means of supporting member 61. Cylinder housing 60 defines cylindrical chamber 62 in its lower end and cylindrical chamber 63 in its upper end, chambers 62 and 63 being separated by partition wall 64 defining opening 65 extending therethrough. A screw-threaded filler hole 82 is provided in the upper end of housing 60 for filling chamber 63 with hydraulic fluid, said hole being closable by means of bolt 83. The lower end wall 96 of housing 60 is traversed by opening 97 for free passage of plug 46 therethrough as said plug is moved vertically.

Disposed within chamber 62 is piston 66 carrying sealing means 67 on its outer periphery, piston 66 being longitudinally movable within chamber 62 in fluid-tight relation with the walls thereof. Disposed within chamber 63 is piston 68 carrying sealing means 69 on its outer periphery, piston 68 being longitudinally movable within chamber 63 in fluid-tight relation with the walls thereof. Pistons 66 and 68 are joined together by means of piston rod 70 which passes through opening 65. A sealing ring 71 is disposed within partition 64 so that piston rod 70 moves through said partition in fluid-tight relation therewith. The lower face of piston 66 may carry a conical recess 72 for receipt of the conical tip 47 of plug 46.

Piston rod 70 which mechanically connects pistons 66 and 68 extends through opening 74 in the upper end of cylinder housing 60. Sealing ring 75 provides a fluid-tight seal between housing 60 and piston rod 70 as the rod moves through opening 74. Screw-threadedly engaged with the upper end of piston rod 70 is spring-retaining member 76 which is secured against rotation on said rod by means of lock nut 77, as shown most clearly in Fig. 4. A spring 78 is arranged concentrically around piston rod 70, its upper end 79 abutting against spring-retaining member 76 and its lower end 80 abutting against cylinder housing 60. Spring 78 exerts an upward bias on pistons 66 and 68 through piston rod 70. A cap 98 may be provided as a dust excluder and may be removably secured to housing 60 in order to cover the upper end of rod 70.

The details of the piston and dash pot arrangement shown in Fig. 1 are shown most clearly in Figs. 4 and 5. Referring to these figures, partition 64 of cylinder housing 60 is provided with an air channel 84 which extends from the lower surface 85 of partition 64 to fitting 86 so that air under a predetermined constant pressure can be admitted from an outside source, not shown, into chamber 62 above piston 66. Piston rod 70 is provided with a central longitudinally extending bore 87, bore 87 continuing through piston 68 and terminating in rod 70. A portion of bore 87 is provided with screw threads 88. Piston 68 is provided with a channel 89 which fluidly connects the upper surface 90 of piston 68 with the lower surface 91 of said piston, a portion of channel 89 intersecting bore 87. A stem 92 carrying screw threads 93 adapted for engagement with screw-threaded portion 88 of central longitudinally extending bore 87 is disposed in said bore with screw threads 93 in engagement with screw-threaded portion 88. The upper end 93 of said stem extends through opening 77' defined by jam nut 77 and may be provided with a slot 94 so that it may conveniently be rotated in said bore. The lower end 95 of stem 92 is in the form of a conically shaped tip.

The area of flow through conduit 89 in piston 68 is controlled by rotating stem 92 when threads 93 carried by said stem are in threaded engagement with threaded portion 88 of rod 70. Under these conditions rotation of stem 92 results in longitudinal motion thereof with respect to rod 70, thus altering the positional setting of the lower end 95 of said stem with respect to conduit 89. By properly adjusting stem 92 within bore 87, channel 89 may be completely closed to the passage of fluid or it may be fully opened to the passage of fluid. Lower end 95 may be placed in any position between the two aforementioned portions to alter the area of flow through channel 89 and therefore to control the rate of flow of fluid through said channel.

Figure 2:
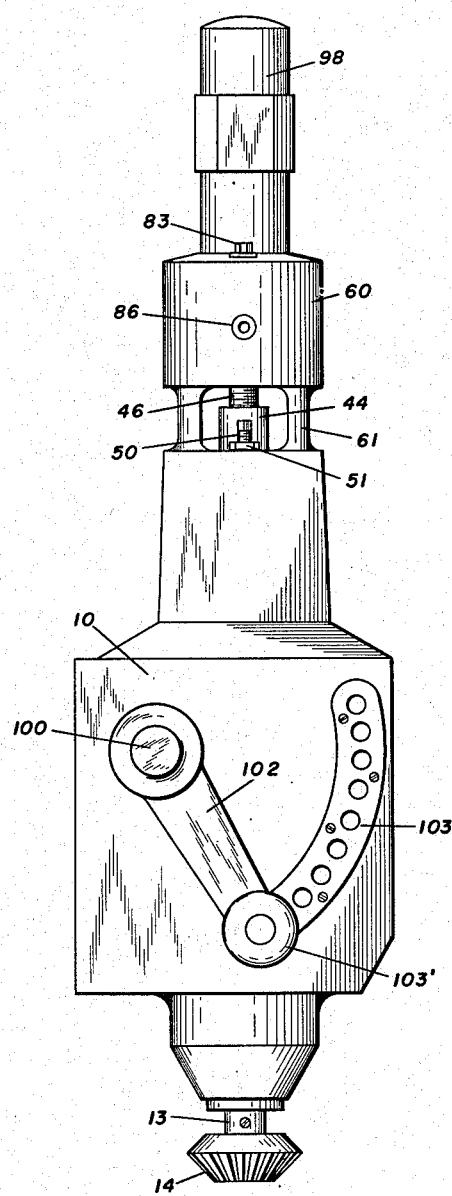
Fig. 2 is a view in elevation of one side of the device shown in Fig. 1.
Figure 3:
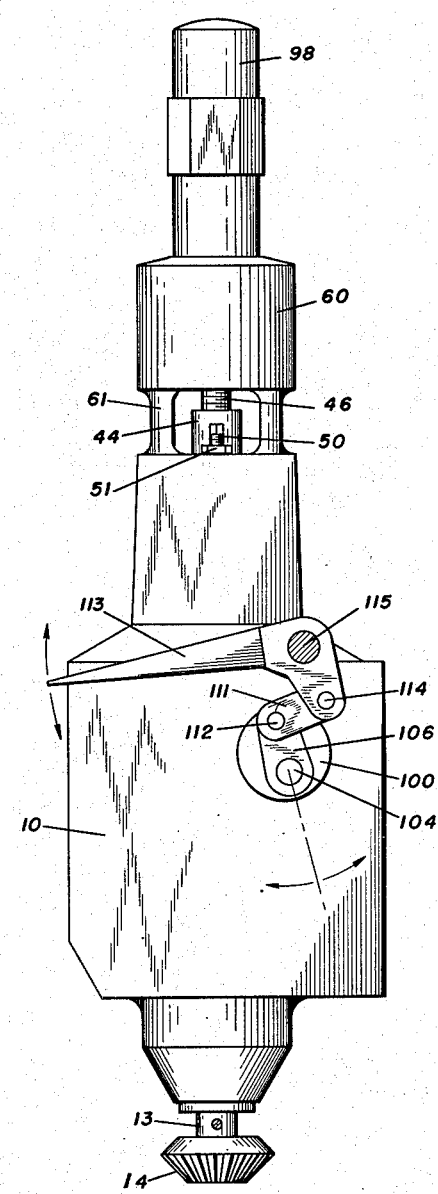
Fig. 3 is a view in elevation of the other side of the device shown in Fig. 1.

The suspension of yoke 27 within housing 10 and the means for setting the governor for controlling the controlled engine at a particular speed is best shown in Figs. 1, 2, 3 and 6. The numeral 100 designates a shaft, the ends of which are shown in Figs. 2 and 3 as extending through and journalled in the walls of housing 10 for arcuate movement about its longitudinal axis. It will be noted that the longitudinal axis of shaft 100 is perpendicular to the longitudinal axis of spindle 13 and stem 33, and, further, that shaft 100 is positioned to the rear of stem 33 and yoke 27, as viewed in Fig. 1. Affixed to end 101 of shaft 100 is handle 102 provided at one end with knob 103', said end being movable by means of knob 103' along bracket 103 to cause arcuate movement of said shaft about its longitudinal axis. A portion of shaft 100 between ends 101 and 101' is cut away, as shown most clearly in Fig. 6. A shaft 104 of smaller diameter than shaft 100 is eccentrically journalled in shaft 100 bridging the cut-away portion thereof, end 105 of shaft 104 extending beyond end 102 of shaft 100 and having bracket 106 affixed thereto. Arms 107 and 108 are each affixed at one end to shaft 104, and pivotally connected to their other end are keys 109 and 110, respectively, which slide horizontally in slots 30 and 30' of yoke member 27. Bracket 106 is pivotally connected to one end of link 111 by means of pivot pin 112 and the other end of link 111 is pivotally connected to pointer 113 by means of pivot pin 114. Pointer 113 is affixed to shaft 115 which is supported for arcuate movement about its longitudinal axis by housing 116. Shaft 115 actuates the mechanism which increases and decreases the amount of fuel admitted to the engine, the speed of which is being controlled by the governor of the present invention.

The operation of the embodiment shown in Figs. 1 to 6, inclusive, will now be described, the parts shown therein and their relation to each other having been fully described hereinbefore. In Figs. 1 and 1-A, governor weights 17 and 17' are shown in the position which they assume when spindle 13 is being rotated; that is, projections 23 and 23' of L-shaped members 16 and 16', respectively, abut on upper surface 24 of the governor weight supporting member 15. Yoke 27 and collar 25 are in the full down position, spring 57 exerting a downward bias on yoke 27. Lower spring-retaining member 34 and stem 33 are also in the full down position, spring 54 biasing lower spring-retaining member 34 away from upper spring-retaining member 40. It will be further noted that pistons 66 and 68 are each in their full down position. When piston 66 is in its full down position and spindle 13 is not being rotated, conical tip 47 of plug 46 does not contact the recess 72 in the lower surface of the piston 66. The purpose for providing this space between tip 47 and recess 72 will become apparent from the description hereinafter given. Pistons 66 and 68 are forced in their full down position by admitting air to chamber 62 through channel 84, the air being under sufficient pressure to overcome the opposing bias exerted by spring 78.

Now suppose knob 103' is moved along bracket 103 to an idling position and further suppose that the engine which the governor is controlling is idling at a slow speed. This in turn means that spindle 13 will be rotated at a low speed and weights 17 and 17' tend to move arcuately about pins 20 and 20', respectively, in the direction indicated by the solid arrow. Since wheels 18 and 18' carried by L-shaped members 16 and 16', respectively, abut against collar 25, outward movement of governor weights 17 and 17' cause collar 25 to be moved upwardly on spindle 13 in sliding contact with the upper end 26 thereof. Upward motion of collar 25 causes upward motion of yoke 27 against the bias of spring 57. Since lower spring-retaining member 34 abuts on shoulder 31 defined by yoke 27 and since spring 54 biases lower spring retaining member 34 away from upper spring-retaining member 40, stem 33 is carried upwardly by yoke 27 without compressing spring 54. This upward motion of yoke 27 is transferred through arms 107 and 108 to shaft 104, thence through bracket 106, link 111 and pointer 113 to shaft 115 which is caused to be moved arcuately in such direction as to decrease the supply of fuel to the engine to be controlled and, therefore, to reduce its speed to that determined by the setting of knob 103' along bracket 103.

Now with the engine idling at the slowed speed hereinbefore mentioned, assume that knob 103' is moved along bracket 103 to a position between the idling position and full throttle position. Movement of knob 103' in this direction produces corresponding arcuate movement of shaft 100, the arcuate movement of shaft 100 being transmitted through shaft 104 to bracket 106 and through link 111 and pointer 113 to shaft 115 to cause arcuate movement of shaft 115 in such a direction as to admit a larger quantity of fuel to the controlled engine. Admission of more fuel to the controlled engine causes the speed of this engine to increase and, accordingly, of spindle 13 to increase. This causes governor weights 17 and 17' to move even further away from the axis of spindle 13, thus raising yoke 27. Upward movement of yoke 27 further compresses low speed spring 57 and further raises stem 33 until conical tip 47 of plug 46 moves into recess 72 and abuts against piston 66. When plug 46 contacts piston 66, further upward movement of stem 33 is opposed by the downward force exerted by said piston. This downward force may be termed the "air cylinder net force" which is the difference between the downward force exerted by piston 66 due to the air pressure applied thereto and the upward force exerted by spring 78 on said piston. If the "air cylinder net force" is less than the preloading of spring 54, further outward movement of governor weights 17 and 17' move piston 66 upwardly until a "balanced force" point is reached, i. e., until piston 66 opposes further upward movement of stem 33 without spring 54 being compressed. If, however, the "air cylinder net force" is greater than the preloading of spring 54, spring 54 will be compressed until its force equals the "air cylinder net force."

It will be apparent that knob 103' may be moved along bracket 103 to the full throttle position or to any other position depending upon the speed at which it is desired that the controlled engine operate. If for any reason the speed of the controlled engine increases above the desired speed, governor weights 17 and 17' will move outwardly in the direction indicated by the solid arrow causing yoke 27 to move upwardly, thus reducing the supply of fuel to the controlled engine. If for any reason the speed of the controlled engine drops below the desired speed, governor weights 17 and 17' will move inwardly in the direction indicated by the dotted arrows thereby permitting yoke 27 to move downwardly, thus increasing the supply of fuel to the controlled engine. In this manner the speed of the controlled engine is always returned to the preselected desired value.

In order to reduce the rate at which piston 66 can move vertically within chamber 62, the dash pot arrangement shown most clearly in Figs. 1, 4 and 5 is provided. As previously pointed out, chamber 63 of housing 60 is filled with a hydraulic fluid. Thus when piston 66 is moved upwardly within chamber 62, any hydraulic fluid trapped above piston 68 must flow through channel 89 to the underside of said piston. The rate of flow through channel 89 is controlled by means of stem 92 in the manner hereinbefore indicated. If, on the other hand, piston 66 is moved downwardly within chamber 62, any hydraulic fluid trapped below piston 68 must flow through channel 89 into the space above piston 68. In this manner the movement of piston 66 within chamber 62 is damped and any tendency of the governor to hunt is reduced.

A simplified air piston arrangement is shown in Fig. 7, this arrangement performing the same function as that shown in Figs. 1 to 6. Referring to Fig. 7, 44 designates a sleeve into which plug member 46 defining conically-shaped tip 47 is screw-threadedly engaged. Bracket 61 supports cylinder housing member 60 above cap member 49 of governor housing 10. Cylinder housing 60 defines an upper chamber 150 and a lower chamber 151, said chambers being separated by means of a partition 152. A central opening 153 extends through said partition. A piston 154 carrying a sealing member 155 on its outer periphery is slidably arranged within chamber 151 in sealing contact with the cylindrical walls thereof. A piston 156 carrying a sealing member 157 on its outer periphery is slidably disposed within chamber 150 in sealing contact with the cylindrical walls thereof. A connecting rod 158 extending through opening 153 mechanically connects pistons 156 and 154. A sealing ring 159 is provided around connecting rod 158 to form a fluid-tight seal between said rod and partition 152. A passage 160 extends from the upper face 161 of piston 156 to the lower face 162 of said piston. A channel 163 extends through partition 152 to the upper face 164 of chamber 151, screw threads 165 being provided at the outer terminus of channel 163 for connection to the source of air under pressure. Threaded bore 166 extends through the upper wall 167 of cylinder housing 60 and is adapted to receive a threaded plug 168 for closing said bore. Chamber 150 is filled with a hydraulic fluid, preferably oil.

Air under the desired pressure is admitted to chamber 151 through channel 163. This air tends to force piston 154 downwardly within chamber 151. Since piston 154 is mechanically connected to piston 156 by connecting rod 158, piston 156 also tends to move downwardly. If pistons 154 and 156 are not in their full down position (that is, as shown in Fig. 7) then the hydraulic fluid trapped between the lower face of piston 156 and partition 152 is forced to flow through passage 160, thus retarding the speed of movement of pistons 154 and 156. When piston 154 is moved upwardly by the upward force exerted through plug 46, piston 156 is also moved upwardly. In this case, the hydraulic fluid above piston 156 must flow through passage 160 of the lower face of said piston. Again, the rate at which pistons 154 and 156 can move is retarded by the flow of hydraulic fluid through passage 160. It will be understood, of course, that the diameter of passage 160 and the viscosity of the hydraulic fluid employed determine the amount of resistance offered to the vertical movement of the pistons.

Instead of employing air actuated piston 66 in the embodiment illustrated in Figs. 1 to 6, inclusive, any air actuated mechanism which is capable of moving longitudinally and of opposing the upward movement of stem 33 may be employed. For example, an air actuated resilient diaphragm may be employed. Such an air actuated mechanism is illustrated in Fig. 8, this mechanism replacing the air actuated piston arrangement shown in Fig. 1. Referring to Fig. 8, numeral 44 designates the sleeve member projecting through the top of the governor housing and carrying plug 46 provided with a conical-shaped tip 47. Supported by members 61 is air diaphragm housing 170. Housing 170 defines a chamber 171, said chamber being closed by means of a resilient diaphragm 172 which may be secured to said housing by means of ring 173 secured to housing 170 by means of a plurality of bolts 174. A fitting 176 is provided at the upper end of chamber 171 for admission of air under pressure from a source, not shown, to said chamber. Resilient diaphragm 172 may be made of any material which is impervious to air and which is capable of repeated flexure and may suitably be made of either natural or synthetic rubber.

Housing 170 also defines cylindrical chamber 177 in which is mounted piston 178 carrying sealing means 179 on its outer periphery, said piston being longitudinally movable in said chamber in fluid-tight relation with the walls thereof. Piston 178 is provided with channel 195 which extends through said piston from the upper surface to the lower surface thereof. Partition 180 separates diaphragm chamber 171 and piston chamber 177 and defines an opening 181 extending therethrough. Rod 182 is mechanically affixed at one end to diaphragm 172 and mechanically affixed at the other end to piston 178. Sealing means 183 is disposed in a recess surrounding opening 181 for providing a fluid-tight seal around rod 182 as it moves through said partition. Mechanically affixed to the upper side of piston 178 is rod 184 which extends through opening 185 in housing 170. Sealing means 186 is disposed in a recess in housing 170 surrounding opening 185 for providing a fluid-tight seal around rod 184 as it moves through said opening. The upper end 187 of rod 184 is provided with screw threads. Spring-retaining member 188 is screw-threadedly engaged with the threaded upper end 187 of rod 184 and jam nut 189 is also threadedly engaged with said end for abutment on spring-retaining member 188. A spring 190 is concentrically arranged around rod 184, its upper end 191 abutting on spring-retaining member 188 and its lower end 192 abutting on housing 170 to bias spring-retaining member 188 away from housing 170. Housing 170 is provided with filler hole 193 which is closable by means of screw-threaded plug 194. Chamber 177 is filled with a hydraulic fluid, such as oil.

It will be understood that instead of providing channel 195 in piston 178 for permitting the flow of hydraulic fluid therethrough as piston 178 is moved longitudinally within chamber 177, the adjustable orifice arrangement shown in Figs. 4 and 5 may be used and greater control secured thereby.

Since the only essential difference between the showing of Fig. 8 and the showing of Fig. 1 is the substitution of rubber diaphragm 172 for piston 66 and since the operation of the embodiment shown in Fig. 8 is in principle the same as the operation of the embodiment shown in Fig. 1, the operation of the embodiment of Fig. 8 will not be further described.

It will be apparent that various changes may be made in the device illustrated and described without departing from the spirit of the present invention. It will be further obvious that the objects hereinbefore mentioned, as well as other objects, are attained by the device of the present invention.

Having fully illustrated and described the device of the present invention, what I wish to claim and secure by Letters Patent is:

1. A spring-loaded governor for maintaining the speed of a rotative prime mover within reasonably constant limits and adjustable for different speeds comprising a spindle for rotation about its longitudinal axis; a pair of weights pivotally mounted on said spindle for arcuate movement when said spindle is rotated; a plurality of springs mounted in tandem and arranged to oppose successively the arcuate movements of said weights as the rotative speed of said spindle is increased and an air actuated mechanism including a dash pot arranged to augment the force exerted by said plurality of springs.

2. A spring-loaded governor for maintaining the speed of a rotative prime mover within reasonably constant limits and adjustable for different speeds comprising a spindle adapted for rotation about its longitudinal axis by said prime mover; a pair of weights pivotally mounted on said spindle for arcuate movement on rotation of said spindle, said weights being arranged to move outwardly from the longitudinal axis of said spindle as the rate of rotation of said spindle is increased; a first spring of low spring rate and a second spring of high spring rate mounted concentrically of said spindle, said springs being arranged to oppose successively the outward arcuate movement of said weights; and an air actuated mechanism including a dash pot arranged to augment the force exerted by said first and said second springs in opposing the arcuate movement of said weights.

3. A spring-loaded governor for maintaining the speed of a rotative prime mover within reasonably constant limits and adjustable for different speeds comprising, in combination, a governor housing; a spindle mounted in said housing for rotation about its longitudinal axis; a pair of weights pivotally mounted on said spindle for arcuate movement on rotation of said spindle, said weights being arranged to move outwardly from the longitudinal axis of said spindle as the rate of rotation of said spindle is increased and to move toward the longitudinal axis of said spindle as the rate of rotation of said spindle is decreased; a yoke mounted in said governor housing for longitudinal movement with respect to said spindle on arcuate movement of said weights; a first spring of low spring rate biasing said yoke in a direction to oppose the outward movement of said weights; a governor stem yieldably supported by said yoke and longitudinally movable by said yoke as said weights move outwardly; a variable pressure air-loaded mechanism including a dash pot disposed in the path of said governor stem for yieldably opposing longitudinal movement of said stem as said weights move outwardly; and a second spring of higher spring rate than said first spring disposed about said governor stem to oppose the longitudinal movement of said yoke when longitudinal movement of said stem is opposed by said air-loaded mechanism.

4. A spring-loaded governor for maintaining the speed of a rotative prime mover within reasonably constant limits and adjustable for different speeds comprising a governor housing; a spindle mounted in said housing for rotation about its longitudinal axis; a pair of weights pivotally mounted on said spindle for arcuate movement on rotation of said spindle, said weights being arranged to move outwardly from the longitudinal axis of said spindle as the rate of rotation of said spindle is increased and to move toward the longitudinal axis of said spindle as the rate of rotation of said spindle is decreased; a yoke mounted in said governor housing for longitudinal movement with respect to said spindle on arcuate movement of said weights; a first spring of low spring rate biasing said yoke away from an end of said governor housing and opposing the outward arcuate movement of said weights; a governor stem carrying a first spring-retaining member slidably mounted on one end thereof for limited longitudinal movement with respect thereto and carrying a second spring-retaining member affixed thereto adjacent the other end thereof, said first spring-retaining member abutting on said yoke and the other end of said stem extending through said end of the governor housing and freely movable therethrough; a second spring of higher spring rate than said first spring biasing said first spring-retaining member away from said second spring-retaining member; and an air actuated mechanism including a dash pot mounted on said end of the governor housing and disposed in the path of said governor stem, said means being arranged to be acted upon by air to oppose the movement of said stem caused by the outward arcuate movement of said weights.

5. A spring-loaded governor for maintaining the speed of a rotative prime mover within reasonably constant limits and adjustable for different speeds comprising, in combination, a governor housing; a spindle mounted in said housing for rotation about its longitudinal axis; a pair of weights pivotally mounted on said spindle for arcuate movement on rotation of said spindle, said weights being arranged to move outwardly from the longitudinal axis of said spindle as the rate of rotation of said spindle is increased and to move toward the longitudinal axis of said spindle as the rate of rotation of said spindle is decreased; a yoke mounted on said governor housing for longitudinal movement with respect to said spindle on arcuate movement of said weights; a first spring of low spring rate biasing said yoke away from an end of said governor housing and opposing the outward arcuate movement of said weights; a governor stem carrying a first spring-retaining member slidably mounted on one end thereof for limited longitudinal movement with respect thereto and carrying a second spring-retaining member affixed thereto adjacent the other end thereof, said first spring-retaining member abutting on said yoke and the other end of said stem extending through said end of the governor housing and freely movable therethrough; a second spring of higher spring rate than said first spring biasing said first spring-retaining member away from said second spring-retaining member; a cylinder housing defining a first cylindrical chamber fluidly connected to a source of air under pressure mounted on said end of the governor housing; a piston slidably arranged in said first chamber in fluid-tight relation with the walls thereof and disposed in the path of said stem, said piston being arranged to be acted upon by air to oppose the movement of said stem caused by the outward arcuate movement of said weights and a dash pot mechanically connected to said piston.

6. A device in accordance with claim 5 in which a third spring of lower spring rate than said first spring is arranged to bias said piston in a direction opposite to the direction which said piston is caused to move by reason of said air pressure.

7. A device in accordance with claim 5 in which said dash pot is formed by the cylinder housing defining a second cylindrical chamber with a piston having a channel extending therethrough disposed in said chamber in fluid-tight relation with the walls thereof, said second cylindrical chamber being filled with hydraulic fluid.

8. A spring loaded governor for maintaining the speed of a rotative prime mover within reasonably constant limits and adjustable for different speeds comprising, in combination, a governor housing, a spindle mounted in said housing for rotation about its longitudinal axis, a pair of weights pivotally mounted on said spindle for arcuate movement on rotation of said spindle, said weights being arranged to move outwardly from the longitudinal axis of said spindle as the rate of rotation of said spindle is increased and to move toward the longitudinal axis of said spindle as the rate of rotation of said spindle is decreased, a yoke mounted on said governor housing arranged to be moved along the axis of said spindle upon arcuate movement of said pair of weights, a mechanical linkage for connecting said yoke with the fuel rack of said prime mover, a low speed spring mounted with its axis parallel to the axis of said spindle with its first end in contact with said yoke and its second end mechanically connected to said governor housing, a piston and cylinder and dash pot assembly carried by the governor housing with means interconnecting the movable element of said dash pot with the piston of said assembly, and a spring loaded means interconnecting said yoke with said piston.

9. A device in accordance with claim 8 in which said spring loaded means interconnecting said yoke with said piston includes a lost motion connection.

10. A device in accordance with claim 8 in which said spring loaded means is a spring loaded telescoping assembly interconnecting with a lost motion connection said yoke with said piston.

11. A device in accordance with claim 8 in which said spring loaded means is a telescoping assembly spring loaded with an over-speed spring and interconnecting with a lost motion connection said yoke with said piston.

ROBERT R. CROOKSTON.

References Cited in the file of this patent

UNITED STATES PATENTS

| Number | Name | Date |
|---|---|---|
| 727,466 | Sederholm | May 5, 1903 |
| 1,127,012 | Kägi | Feb. 2, 1915 |
| 1,600,542 | Gagy | Sept. 21, 1926 |
| 1,891,668 | Cook | Dec. 20, 1932 |
| 2,201,682 | Johansson | May 21, 1940 |
| 2,227,427 | Ehrhart | Jan. 7, 1941 |
| 2,254,970 | MacNeil | Sept. 2, 1941 |
| 2,332,925 | Martin | Oct. 26, 1943 |
| 2,364,115 | Whitehead | Dec. 5, 1944 |
| 2,378,558 | Kalin | June 19, 1945 |
| 2,397,876 | Martin | Apr. 2, 1946 |
| 2,481,020 | Justus | Sept. 6, 1949 |
| 2,590,940 | Collins | Apr. 1, 1952 |

FOREIGN PATENTS

| Number | Country | Date |
|---|---|---|
| 437,772 | France | Feb. 27, 1912 |